(12) United States Patent
Vasshus et al.

(10) Patent No.: US 9,242,276 B2
(45) Date of Patent: Jan. 26, 2016

(54) METHOD FOR MONITORING THE INTEGRITY OF A SIEVE DEVICE AND APPARATUS FOR PRACTICE OF THE METHOD

(75) Inventors: Jan Kristian Vasshus, Sandnes (NO); Arne Malmin, Kleppe (NO)

(73) Assignee: Cubility AS, Sandnes (NO)

( * ) Notice: Subject to any disclaimer, the term of this patent is extended or adjusted under 35 U.S.C. 154(b) by 330 days.

(21) Appl. No.: 14/005,932

(22) PCT Filed: Mar. 15, 2012

(86) PCT No.: PCT/NO2012/050041
§ 371 (c)(1),
(2), (4) Date: Sep. 18, 2013

(87) PCT Pub. No.: WO2012/128641
PCT Pub. Date: Sep. 27, 2012

(65) Prior Publication Data
US 2014/0009303 A1    Jan. 9, 2014

Related U.S. Application Data

(60) Provisional application No. 61/467,217, filed on Mar. 24, 2011.

(30) Foreign Application Priority Data

Mar. 23, 2011   (NO) .................................... 20110438

(51) Int. Cl.
*G01V 3/00* (2006.01)
*B07B 1/00* (2006.01)
(Continued)

(52) U.S. Cl.
CPC . *B07B 1/00* (2013.01); *B01D 33/04* (2013.01); *B01D 35/1435* (2013.01); *B07B 1/10* (2013.01);
(Continued)

(58) Field of Classification Search
USPC ....................................... 340/854.6
See application file for complete search history.

(56) References Cited

U.S. PATENT DOCUMENTS 4,684,946 A * 8/1987 Issenmann ............ E21B 17/003
175/50
4,981,208 A    1/1991 Jones
(Continued)

FOREIGN PATENT DOCUMENTS

EP    0138363    4/1985
EP    0906778    4/1999
(Continued)

*Primary Examiner* — Naomi Small
(74) *Attorney, Agent, or Firm* — Gable Gotwals (57) ABSTRACT

A method and an apparatus for monitoring the integrity of an endless sieve device (3) which is arranged to rotate around at least two spaced-apart turning rollers are described, the sieve device (3) being arranged to separate fluid and particles under a predetermined size from particles over the predetermined size, the method including the steps of:
- positioning at least one signal transmitter (7) at a portion of the sieve device (3) by means of a holding device (5, 5', 5");
- putting the at least one signal transmitter (7) in communication with at least one receiver (9), so that the signal transmitter (7) outputs a signal to the at least one receiver (9) at least once per turn of the sieve device (3);
- exposing the holding device (5, 5', 5") to wear; and
- letting the receiver (9) output a signal activating a warning device when the expected signal from the signal transmitter (7) ceases.

18 Claims, 8 Drawing Sheets

(51) Int. Cl.
*B01D 33/04* (2006.01)
*B01D 35/143* (2006.01)
*B65G 17/08* (2006.01)
*B65G 43/02* (2006.01)
*B07B 1/10* (2006.01)
*B07B 1/46* (2006.01)
*E21B 21/06* (2006.01)
*G08C 17/02* (2006.01)

(52) U.S. Cl.
CPC ............ *B07B 1/4627* (2013.01); *B65G 17/083* (2013.01); *B65G 43/02* (2013.01); *E21B 21/065* (2013.01); *G08C 17/02* (2013.01)

(56) References Cited

U.S. PATENT DOCUMENTS

| | | | |
|---|---|---|---|
| 6,636,159 B1 * | 10/2003 | Winnacker | E21B 47/187 340/854.3 |
| 2010/0182001 A1 | 7/2010 | Furukawa et al. | |
| 2010/0231396 A1 | 9/2010 | Tump | |

FOREIGN PATENT DOCUMENTS

| | | |
|---|---|---|
| WO | 03057376 | 7/2003 |
| WO | 2009047282 | 4/2009 |

* cited by examiner

METHOD FOR MONITORING THE INTEGRITY OF A SIEVE DEVICE AND APPARATUS FOR PRACTICE OF THE METHOD

CROSS-REFERENCE TO RELATED APPLICATIONS

This United States National Phase of PCT Application No. PCT/NO2012/050041 filed 15 Mar. 2012, claims priority to Norwegian Patent Application No. 20110438 filed 23 Mar. 2011 and U.S. Provisional Patent Application No. 61/467,217 filed 24 Mar. 2011, each of which are incorporated herein by reference.

BACKGROUND OF THE INVENTION

The present invention relates to a method and an apparatus for monitoring a sieve device. More particularly, it relates to a method and an apparatus for monitoring the integrity of an endless sieve device which is arranged to rotate around at least two spaced-apart turning rollers, the sieve device being arranged to separate fluid and particles under a predetermined size from particles over the predetermined size.

In use, the sieve device rotates around the turning rollers so that the external surface of the sieve device between the turning rollers alternates between a position facing upwards, in which it may receive material, and a position facing downwards. In what follows, the portion of the filter belt which is in the position facing upwards will be referred to as being in the position of application, whereas the portion of the sieve device which is in the position facing downwards will be referred to as being in the return position.

One of the areas of application of the sieve device is in connection with the drilling of wells in the petroleum industry, in which there is a need to separate solid material from drilling fluid, as it will be known to a person skilled in the art.

The sieve device may be constituted by one, two or more layers of filter belts with different mesh apertures. A fine-meshed filter belt can be relatively fragile. To be able to carry the mass which is supplied to such a fine-meshed filter belt in the position of application, it is common for it to be supported. Such support may be provided by a relatively coarse-meshed filter or supporting belt which is considerably more robust than the filter belt. In order to inter alia keep the supporting belt and thereby also the filter belt substantially rectilinear between the turning rollers, the supporting belt is supported by a plurality of elongated, stationary supporting elements. The supporting elements may extend parallel to the direction of rotation of the sieve device or at any angle relative to the direction of rotation of the sieve device. Without the supporting elements, the supporting belt and thereby the filter belt may take a curved path of motion between the turning rollers in the position of application in consequence of the load caused by the solid particles and the fluid supplied to the sieve device. Such a curved path will cause further stretching of the sieve device, which is not desirable. It will be understood that in some situations in use, the sieve device may be constituted by just the supporting belt without any further, finer cloth being placed thereon.

In the position of application, the supporting belt will be moved along the stationary supporting elements and wear will arise.

It is important to keep control of the integrity or condition of the supporting belt. This is because a person skilled in the art will be acquainted with the fact that rupture in the entire supporting belt or parts thereof could have large negative consequences to a drilling operation and, at the same time, cause damage to the sieve apparatus. Thus, regular visual inspection of the supporting belt is required, an inspection which requires the sieve device to be stopped. Consequently, the drilling operation will also have to be stopped while the inspection is going on, or then again the mass to be purified must be redirected to another sieve apparatus. Inspections could also be carried out in connection with replacing the filter belt.

Experience goes to show that wear of the supporting belt is dependent only to a limited degree on the period of use or number of rotations of the supporting belt. This poses challenges with respect to planning the frequency of the visual inspection. The practice has therefore been to carry out relatively frequent inspections of the supporting belt, and that this has been replaced with a new one in good time before it strictly required replacing, so that the likelihood of a break in the supporting belt is reduced.

A possible cause of the relatively unpredictable wear of the supporting belt is that the fluid which is supplied to the sieve device or the liquid which is filtered through a possible filter belt contains a varying amount of particles, while, at the same time, the particles may be of different shapes and hardness according to what type of formation is being drilled. Another cause of the relatively unpredictable wear of the supporting belt may be explained as the wear being dependent on the supply rate of mass onto the sieve device, a higher supply rate entailing greater friction between the supporting belt and the stationary supporting elements. The combination of the properties of the drilling fluid that is coming out of the well, including temperature, intermingling of drilled cuttings, and influx of hydrocarbons may give large variations in the wear of the supporting belt.

Some of the stationary supporting elements could be provided with vibration devices which are arranged to set the supporting elements in vibration.

The inventors have realized that there is a need for automated monitoring of the integrity of the supporting belt.

From the publication WO 2010/033527 a monitoring system for a conveyor belt of the kind that is used for conveying ore in the mining industry, for example, is known. The purpose of the monitoring system is to be able to reveal whether critical damage, such as a rupture in the belt, for example, is in the process of arising. This is solved by means of a plurality of sensors integrated in a joint portion and in other portions of the belt that are empirically the most prone to damage. The sensors are connected to a control system and a display which presents the condition of the belt in real time to a user.

The sensors proposed for use according to WO 2010/033527 are integrated in the belt during its production. Thus, the positioning must be decided on before the belt is put in production. Replacing a damaged sensor, or positioning it elsewhere after the belt has been produced, is difficult and expensive.

General prior art are found from the publications EP 0906778, US 2010182001, EP 1570948, WO 2009/047282 and U.S. Pat. No. 4,981,208.

The invention has for its object to remedy or reduce at least one of the drawbacks of the prior art or at least provide a useful alternative to the prior art.

The object is achieved through features which are specified in the description below and in the claims that follow.

In a first aspect of the present invention, a method of monitoring the integrity of an endless sieve device arranged to rotate around at least two spaced-apart turning rollers is provided, the sieve device being arranged to separate fluid and particles under a predetermined size from particles over the predetermined size, the method including the steps of:

positioning at least one signal transmitter at a portion of the sieve device by means of a holding device including a wear element (51, 51', 51") which is arranged to release at least the signal transmitter (7) from the sieve device (3) when the wear element (51, 51', 51") is worn away;

putting the at least one signal transmitter into communication with at least one receiver, so that the signal transmitter is capable of outputting a signal to the at least one receiver at least once per turn of the sieve device;

exposing the holding device to wear; and letting the receiver output a signal activating a warning device when the expected signal from the signal transmitter fails to appear.

The holding device is arranged to be placed at the sieve device after this has been manufactured. This includes placing the holding device at the supporting device in situ. This has the effect of enabling both the number of signal transmitters and its/their position(s) at the supporting belt to be optimally located. For example, the holding device may be moved from one place to another place where the wear turns out to be heavier.

The holding device may be arranged in such a way that it is exposed to substantially the same wear as the supporting belt as soon as the supporting belt is put into service for the first time, or then again it may be arranged in such a way that it is exposed to substantially the same wear as the supporting belt only after the supporting belt has sustained a certain amount of wear and tear.

The wear element may include at least one coupling element which is attached to a portion of the supporting belt, the coupling element being exposed to wear in such a way that the holding device is released from the supporting belt when all of the at least one coupling element is worn out.

The holding device may be constituted by a housing arranged to house the signal transmitter, wherein at least a portion of the housing is exposed to wear in such a way that the signal transmitter is released from the housing when a sufficiently large portion of the housing has been worn away so that the signal transmitter may pass through the worn portion of the housing. The housing may be constituted by a bore in a portion of the supporting belt, wherein the centre axis of the bore is arranged eccentrically relative to a centre axis of an element of the supporting belt in which the bore is located. Alternatively, the housing may be constituted by a jacket.

In one embodiment of the present invention, a second receiver which is arranged to communicate with the signal transmitter is placed in a downstream portion of the sieve device, the second receiver being arranged to output a signal to a further warning device when a signal is received from the signal transmitter. This has the effect of enabling a warning that the signal transmitter has been detached from the supporting belt and is at a distance therefrom. Said downstream portion may be in a portion in which separated solid particles are conveyed, or then again it may be a portion in which separated drilling fluid is conveyed. Thus, the latter may be placed in association with a secondary filter of the kind that appears from the applicant's Norwegian patent application NO 20101011.

In a preferred embodiment, the signal transmitter is a so-called RFID tag and the receiver is an RFID transceiver, which are both based on well-known and well-tested technologies that will be known to a person skilled in the art.

In one embodiment, a filter belt, too, of the kind that is arranged to be placed on the supporting belt is provided with at least one signal transmitter in addition to the signal transmitter or transmitters placed in the supporting belt. The signal transmitter in the filter belt is arranged for information communication with a receiver. The receiver is arranged to communicate with a control system which is arranged to check, at least when starting up after replacement of the filter belt, whether a signal is received from the signal transmitter and whether the signal contains an expected piece of information. If a signal fails to appear, or if the signal is not as expected, the system is arranged to output a signal to a warning device. This has the effect of enabling a warning to an operator if a filter belt is incorrectly installed, or if a wrong filter belt is used in relation to a predetermined filter belt. An RFID tag may output information on the type of filter belt. This information may be compared with data for the well planning containing information about the cleaning of drilling fluid. A control system may then warn if the information reading about type of filter belt does not agree with the planned type of filter belt.

The receiver which is arranged to receive a signal from the signal transmitter in the filter belt may be the same receiver that is arranged to receive a signal from the signal transmitter in the supporting belt.

With at least one signal transmitter in the supporting belt and at least one signal transmitter in the filter belt, it will be possible to monitor, by measuring the rotational speeds of the supporting belt and the filter belt, whether the filter belt and the supporting belt are rotating at the same speed, among other things. This may, among other things, provide information on whether there is sufficient engagement between the filter belt and the supporting belt, or whether the filter belt is slipping or "spinning" on the supporting belt.

The signal transmitter may be an RFID tag and the receiver an RFID transceiver, for example.

One of the advantages of providing the filter belt with a signal transmitter is that the usage history of the filter belt may be monitored. A person skilled in the art will be acquainted with the fact that, in some cases, it is necessary to replace a type of filter belt with another filter belt of a different mesh size, even if it is not worn out.

In a second aspect of the present invention, an apparatus for monitoring the integrity of an endless sieve devise which is arranged to rotate around at least two spaced-apart turning rollers is provided, the sieve device being arranged to separate fluid and particles under a predetermined size from particles over the predetermined size, the apparatus including:

a holding device arranged to carry a signal transmitter in a desired portion of the sieve device, the holding device including a wear element which is arranged to release at least the signal transmitter from the sieve device when the wear element is worn away;

a receiver which is arranged to receive a signal from the signal transmitter; and a control system which is of an arrangement such that the receiver outputs a signal to a warning device when an expected signal from the signal transmitter fails to appear or ceases.

Additional features will appear from the claims 11-16 and from the following description.

In a third aspect of the present invention, an application of the sieve apparatus of the second aspect of the invention to record well data that are brought up from a well by means of data collected by means of at least one RFID tag circulated in the well is provided.

To gather information on, inter alia, factors of the well as mentioned above, greatly affecting the wear on the supporting belt, it has been found to be very appropriate to circulate one or more data acquisition devices such as appropriate RFID signal transmitters, for example, into the well and make them flow out of the well over the rotating filter. Data that the RFID signal transmitter has picked up downhole, may then be read directly by the antenna or the transceiver which is arranged in association with the rotating sieve device. Thus, by means of the control system and a database, the information read may thus build an algorithm for the remaining lifetime of the supporting belt.

In what follows, an example of a preferred embodiment is described, which is visualized in the accompanying drawings, in which:

FIG. 2 shows, on a larger scale, a perspective view of a detail A of FIG. 1a;

Figure 1A:
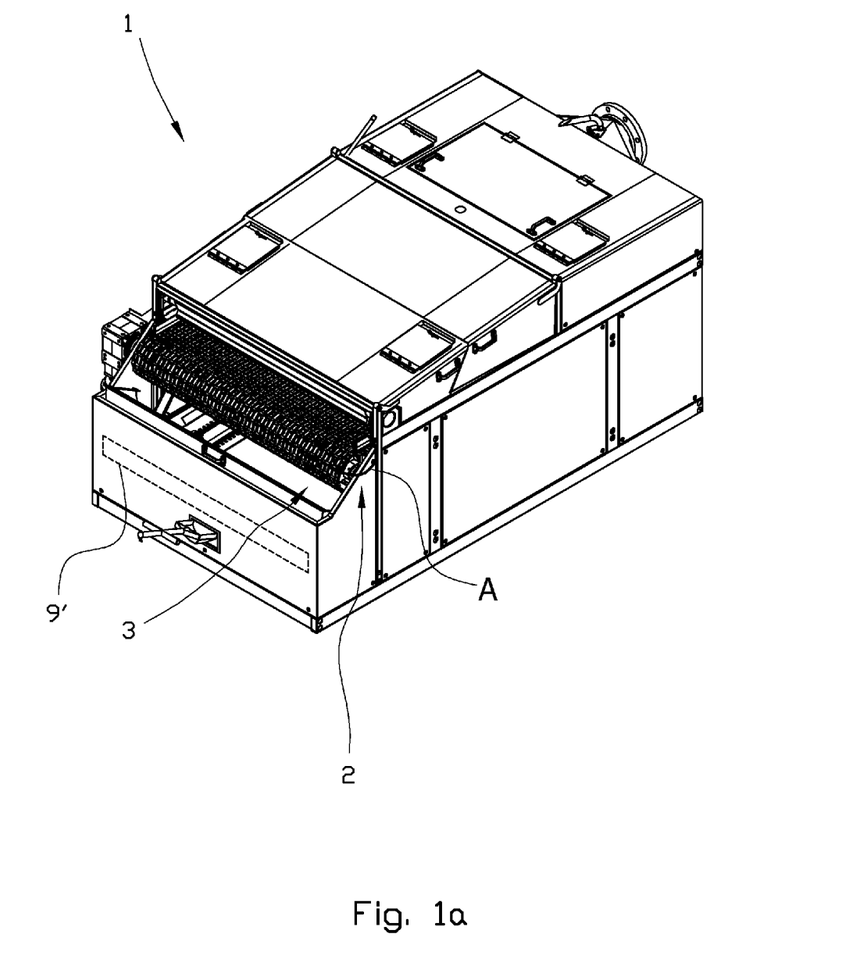
FIGS. 1a and 1b show perspective views of a sieve apparatus which is provided with a rotating sieve device.
Figure 1B:
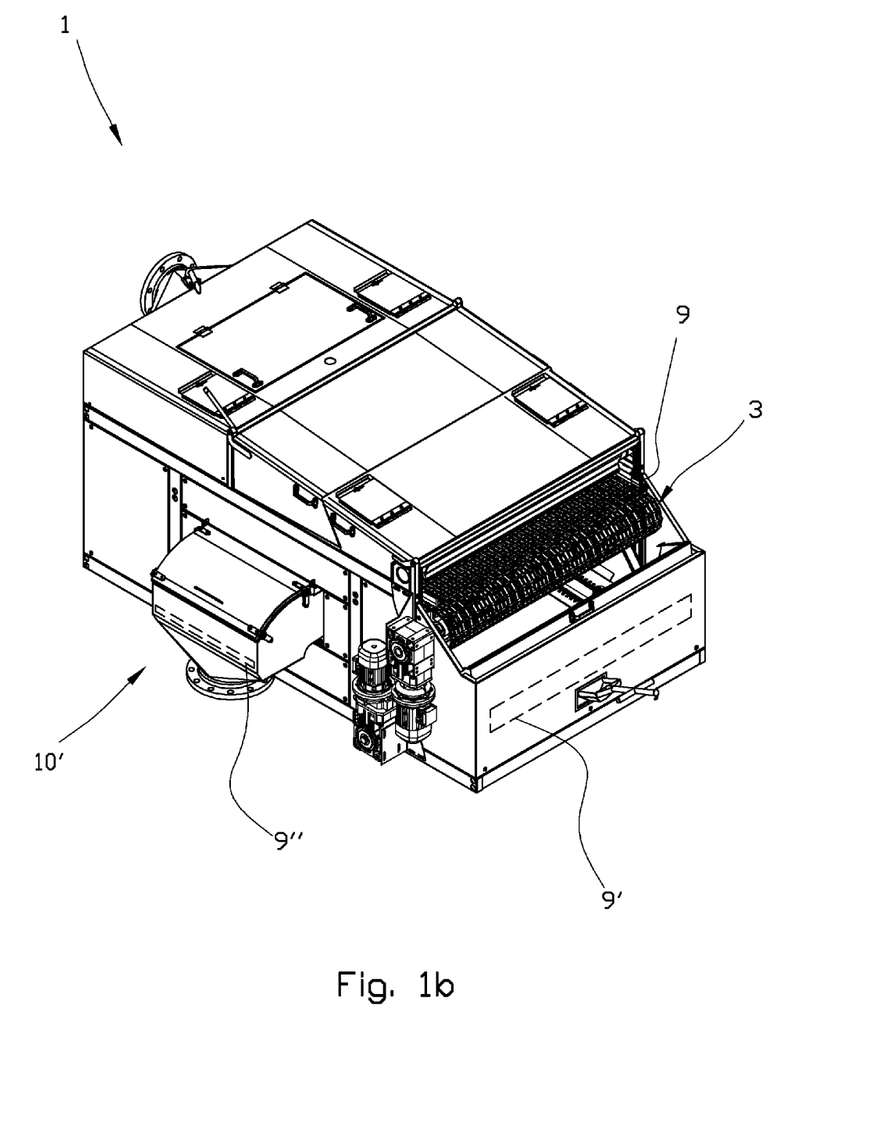

In the figures, the reference numeral 1 indicates a sieve apparatus which includes an endless sieve device 3. The sieve apparatus 1 is of the kind sold under the trade mark "Mud-Cube®" by the present applicant. In FIGS. 1a and 1b, only a portion of the sieve device 3 which is at a turning roller 2 is shown.

Figure 2:
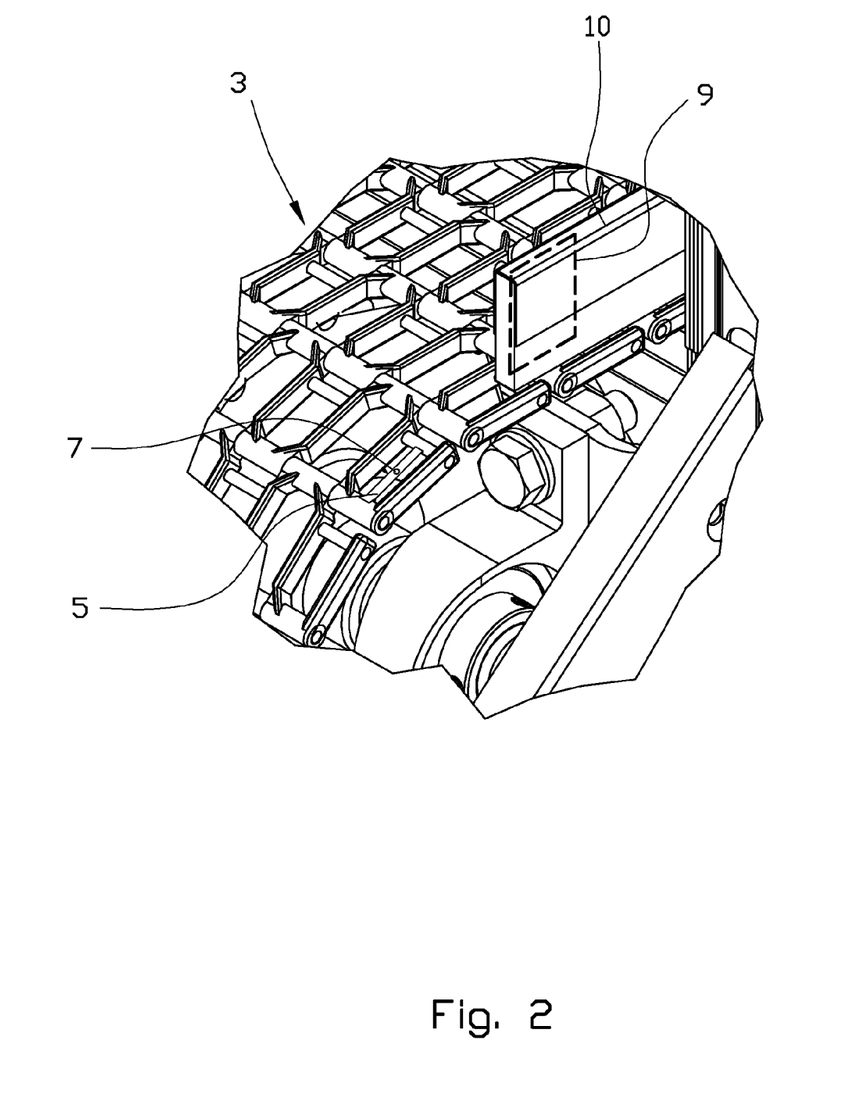

FIG. 2 shows, on a larger scale, a detail A which is indicated in FIG. 1a. In FIG. 2, the sieve device 3 is shown as a supporting cloth or a supporting belt 3. When there is a need to sieve very coarse particles, the supporting belt 3 alone may function as a sieve device. However, a filter belt with smaller apertures, not shown in FIG. 2, will normally be placed externally on the supporting belt 3 when, for example, drilling fluid is to be separated from solid particles. However, it is the supporting belt 3 that in use rests glidingly against supporting elements 15 (see FIG. 6) and sustaining wear and tear which is desired to monitor by means of the method and the apparatus according to the present invention.

In the embodiment shown, a holding device 5 spans an aperture in the supporting belt 3. A signal transmitter in the form of an RFID tag (Radio Frequency Identification tag) 7 is attached to the holding device 5. A person skilled in the art will know that the RFID tag contains an antenna which enables it to receive and respond to radio frequency signals from an RFID transceiver 9 which is fixed at an antenna support 10 in the sieve apparatus 1. In the embodiment shown, the antenna support 10 is a guide element which is placed above an outer portion of the supporting belt 3.

In the embodiment shown, the RFID tag 7 is placed at an outer portion of the supporting belt 3 to ensure communication contact between the RFID tag 7 and the RFID transceiver 9.

In what follows, for simplicity, the RFID transceiver 9 will be referred to as the "receiver" 9. Because of the short distance between the RFID tag 7 and the receiver 9, the RFID tag 7 will have to be of a so-called passive kind. However, it will be understood that the RFID tag could also be of a so-called active kind, transmitting a more powerful response signal and thereby having a greater range. In contrast to a passive RFID tag, an active RFID tag requires a power source.

Figure 3:
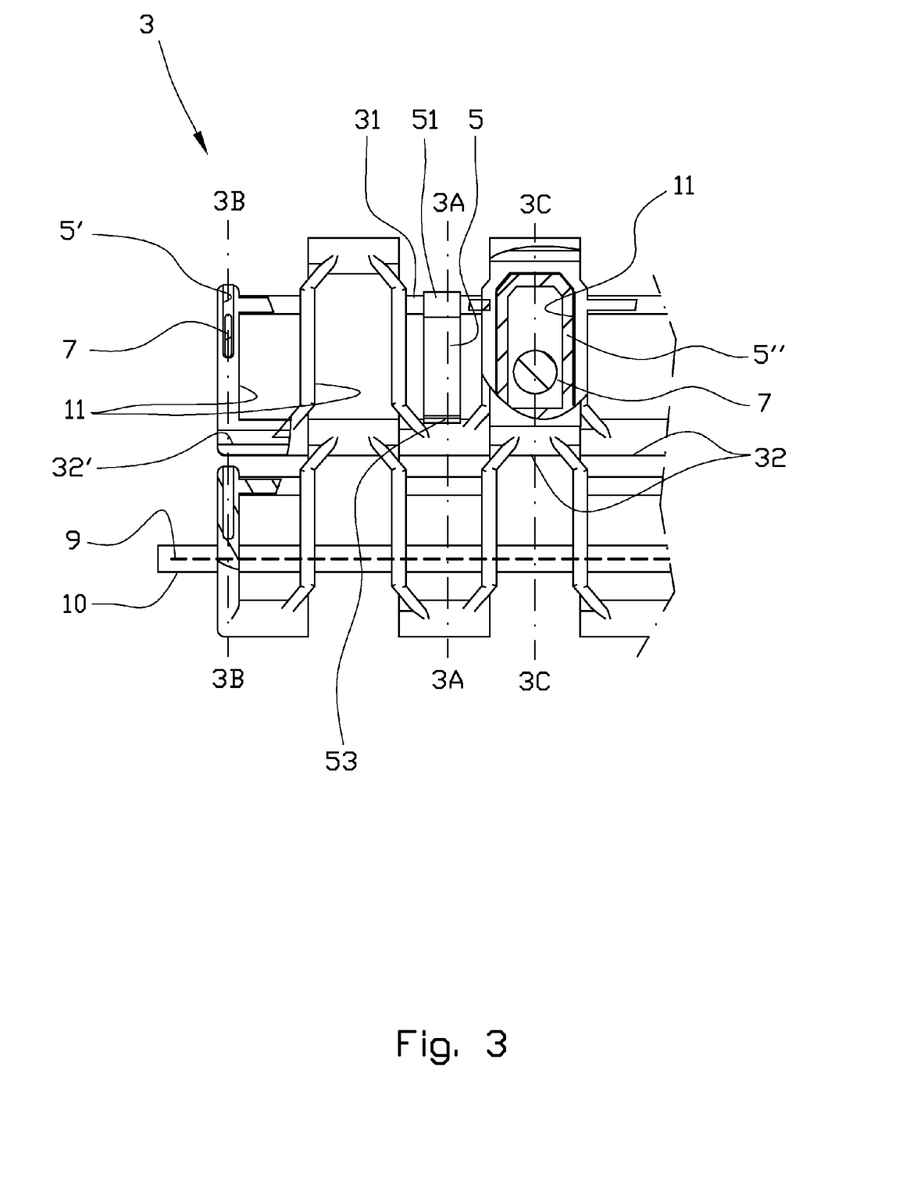
FIG. 3 shows, on a larger scale, a portion of a supporting belt seen from an underside and partly in section, the supporting belt being provided with three different types of holding devices.

By placing an antenna support 10, carrying the RFID transceiver 9 or the receiver, for example transversely to or at an angle to the rotational direction of the supporting belt 3, even a passive RFID tag 7 could be placed anywhere in the supporting belt 3 as the RFID tag 7 will then pass the receiver 9 once per turn of the sieve device. Such a solution is indicated in FIG. 3 and in FIG. 5.

In FIGS. 1a and 1b, a second receiver 9' is also shown, which is arranged to communicate with the signal transmitter 7 in a downstream portion of the sieve device 3, the second receiver 9' being arranged to output a signal to a warning device when a signal is received from the signal transmitter 7, so that there will be a warning that the signal transmitter 7 has been detached from the sieve device 3.

In the embodiment shown, it will be understood that the sieve device 3 is rotating anticlockwise. Solid particles which are retained by the sieve device 3 will thus be carried to fall off to the left of the sieve device 3. The receiver 9' shown in FIG. 1a may thus pick up signals from a signal transmitter 7 which might be carried along with the solid particles. To pick up signals from a signal transmitter that is being carried in drilling fluid which has been cleaned of solid particles, a further receiver 9" may be placed in association with a downstream liquid portion, for example in a secondary filter 10'.

In the FIGS. 3, 4a-c and 5, the holding device shown in FIG. 2 and two alternative holding devices are shown in more detail.

In FIG. 3 is shown a portion of the supporting belt 3 seen from an underside; from the side of the supporting belt 3 that will rest against a turning roller 2 and against the supporting element 15 (see FIG. 6), that is. The portion of the supporting belt 3 shown is provided with three different types of holding devices: a first holding device 5 of the kind that is shown in FIG. 2; a second holding device 5' which has been provided by means of a bore in the supporting belt 3, an RFID tag 7 being loosely positioned in the bore 5'; and a third holding device 5" constituted by a housing placed in one of the apertures 11 of the supporting belt 3, a signal transmitter in the form of an RFID tag 7 being loosely positioned in the housing 5".

For reasons of illustration, the second holding device 5' and the third holding device 5" are shown partially cut through.

The first holding device 5 is suspended across one of the apertures 11 in the supporting belt 3. In a first end portion (shown at the top in FIG. 3), the holding device 5 is provided with a coupling element 51 in the form of a clip which fits complementarily on a stay bar 31 in the supporting belt 3. The clip 51 surrounds at least half the circumference of the stay bar 31. At its second end portion, the holding device 5 is provided with a curved base 53 resting against a connecting stay 32 of the supporting belt 3. As the holding device 5 is fitted, the base 53 is pressed against the connecting stay 32 and the clip 51 is then pressed around the stay bar 31. By a possible dismounting, for example if the holding device 5 is desirably to be moved somewhere else on the supporting belt 3, the clip 51 is released from the stay bar 31, after which the holding device 5 will be loose.

Figure 4A:
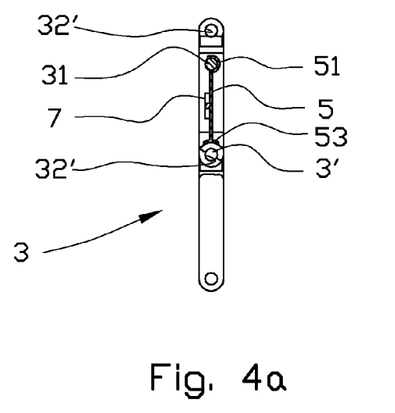
FIG. 4a shows a view of the supporting belt of FIG. 3, seen through a plane shown by the line 3A-3A.
Figure 5:
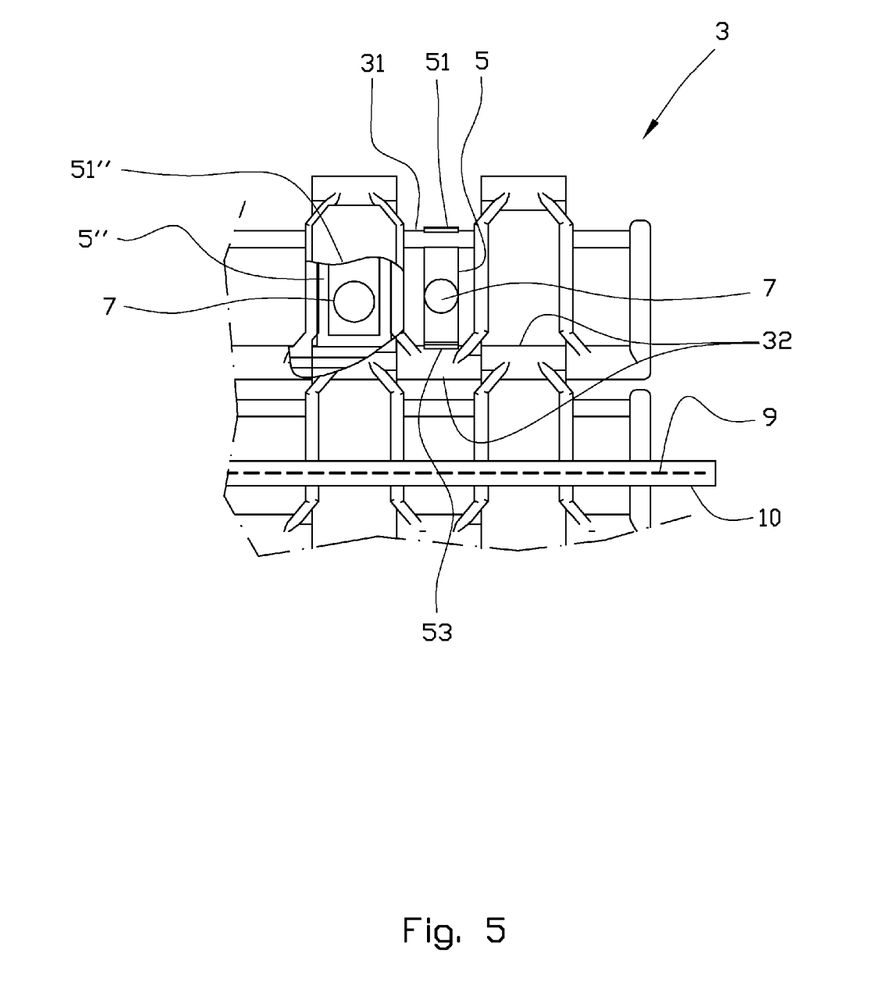
FIG. 5 shows the supporting belt of FIG. 3 seen from a top side, but only two types of holding devices being shown.

In FIG. 4a, the holding device 5 is shown from the side, whereas in FIG. 5, it is shown in a top-side view.

A break in the supporting belt 3 could arise when a connecting rod 3' (see FIGS. 4b-4c), which is passed through bores 32' in the connecting stays 32, is released because of a portion of the bore wall having been worn away. It is the wear that may lead to such a break that is desirably to be monitored.

This is achieved by the clip 51 of the holding device 5 wearing out and thereby releasing the holding device 5 with the RFID tag 7 from the supporting belt 3 before the bore wall has been worn away sufficiently for said connecting rod 3' to be released from the connecting stay 32 of the supporting belt 3. When the RFID tag 7 no longer responds to a signal from the receiver 9, a warning signal will be emitted. The warning signal may be for example a sound signal and/or a light signal or a message to a monitoring screen.

The holding device 5 being of such a design as that shown in FIG. 4*a*, it will be understood that the clip 51 will be exposed to the same wear as the connecting stay 32 only after the connecting stay 32 has worn somewhat. This is because the clip 51 has a "recessed" position relative to the portions of unused supporting belt 3 resting on the supporting elements 15 (see FIG. 6). I should be emphasised that the supporting elements 15 could also, or alternatively, extend transversely to or at an angle to the rotational direction of the supporting belt 3.

To achieve the same rate of wear on the supporting belt 3 and the clip 51, it may be an advantage if, but not necessary that, the clip 51 is made of the same material as the supporting belt 3 or of a material which has substantially the same wear rate as the supporting belt 3.

The control system needed to provide the warning signal when a signal from the RFID tag 7 fails to appear will be known to a person skilled in the art and, for that reason, will not be described in further detail in this document. For the same reason, the control system or its connection to the receiver 9 is not shown.

Figure 4B:
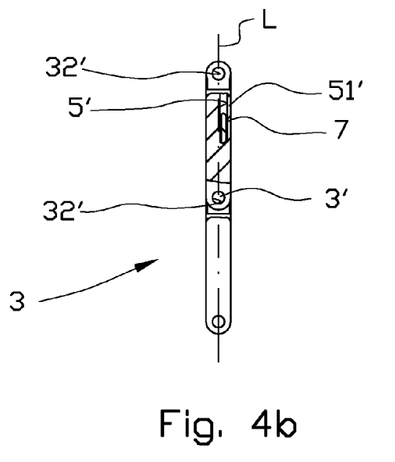
FIG. 4b shows a view of the supporting belt of FIG. 3, seen through a plane shown by the line 3B-3B.

The positioning of the second holding device 5' which has been provided by means of a bore in the supporting belt 3 appears clearly from FIG. 4*b*. The bore 5' is placed eccentrically relative to an axis L which extends at right angles between longitudinal axes of bores 32' in two parallel connecting stays 32. In the embodiment shown, the bore 5' is thus positioned closer to a supporting element 15 supporting the supporting belt 3 than to a filter belt 4 that might be carried by the supporting belt 3. The purpose of the eccentric location of the bore 5' is that its outer wall 51' is to be worn away before a wall of the bore 32' in the connecting stays 32 has been worn away as explained above.

When the outer wall of the bore 5' has been worn away, the RFID tag 7 which is loosely positioned in the bore 5' will be released from the supporting belt 3. When the RFID tag 7 no longer responds to a signal from the receiver 9, a warning signal will be emitted. The warning signal may be a sound signal and/or a light signal, for example. It will be understood that the end portion of the bore 5' is sealed by means of a suitable sealing means after the RFID tag 7 has been positioned in the bore 5'.

Figure 4C:
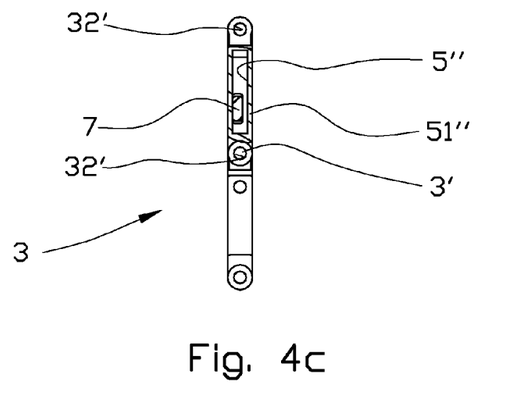
FIG. 4c shows a view of the supporting belt of FIG. 3, seen through a plane shown by the line 3C-3C.

The positioning of the third holding device 5" which is constituted by a housing appears from FIGS. 3, 4*c* and 5. The housing 5" is placed in an aperture 11 in the supporting belt 3, for example by means of two bases corresponding to the base 53 explained for the first holding device 5.

When the wall portion 51" of the housing 5" has been worn away, the RFID tag 7 which is loosely positioned in the housing 5" will be released from the supporting belt 3 in a manner corresponding to that explained for the second holding device 5'.

Thus, the clip 51 and the walls 51', 51" of, respectively, the holding device 5, the bore 5' and the housing 5" constitute wear elements. While the wear on the clip 51 occurs only after the supporting belt 3 has sustained a certain amount of wear and tear, wear on the walls 51', 51" of the bore 5' and the housing 5" of the embodiments shown will occur at the same time as wear occurs on the supporting belt 3 will occur.

Figure 6:
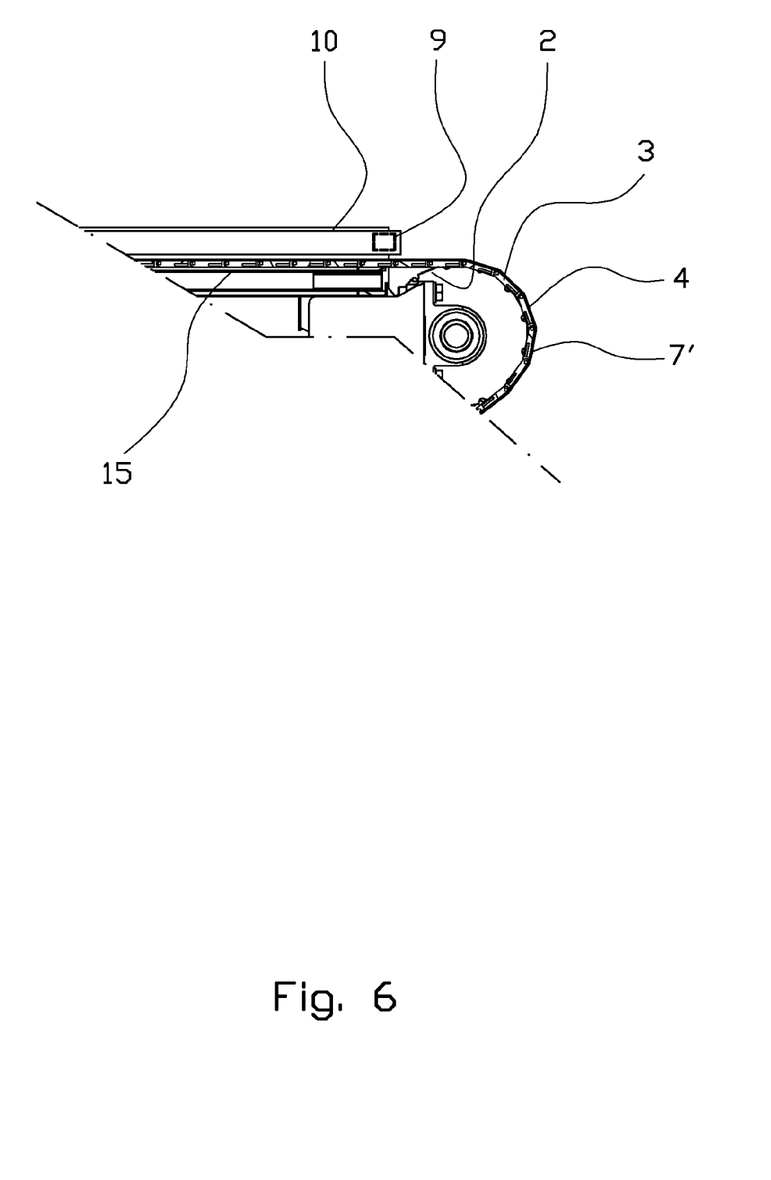
FIG. 6 shows a principle drawing of a portion of a sieve device which is supported by a supporting element.

FIG. 6 shows a side view of a rotating sieve device, in which a filter belt 4 is placed on the supporting belt 3, and in which the supporting belt 3 is supported by supporting elements 15 (one shown) extending in the rotational direction of the sieve device.

The filter belt 4 is provided with a signal transmitter in the form of an RFID tag 7'. The purpose of the RFID tag 7' is to enable information communication with the receiver 9. By putting the receiver 9 in communication with a control system which is arranged to check, at least when starting up after replacement of the filter belt 4, whether the signal received from the RFID tag 7' corresponds to an expected signal, it may be revealed whether the right type of filter belt 4 is installed in the sieve apparatus 1. In addition, the control system may be arranged to output a signal to a warning device if a signal is not received at the start. This could be indicative of the filter belt 4 being installed the wrong way round. The signal transmitter 7' may be attached to or integrated in the cloth in a manner known per se.

Figure 7:
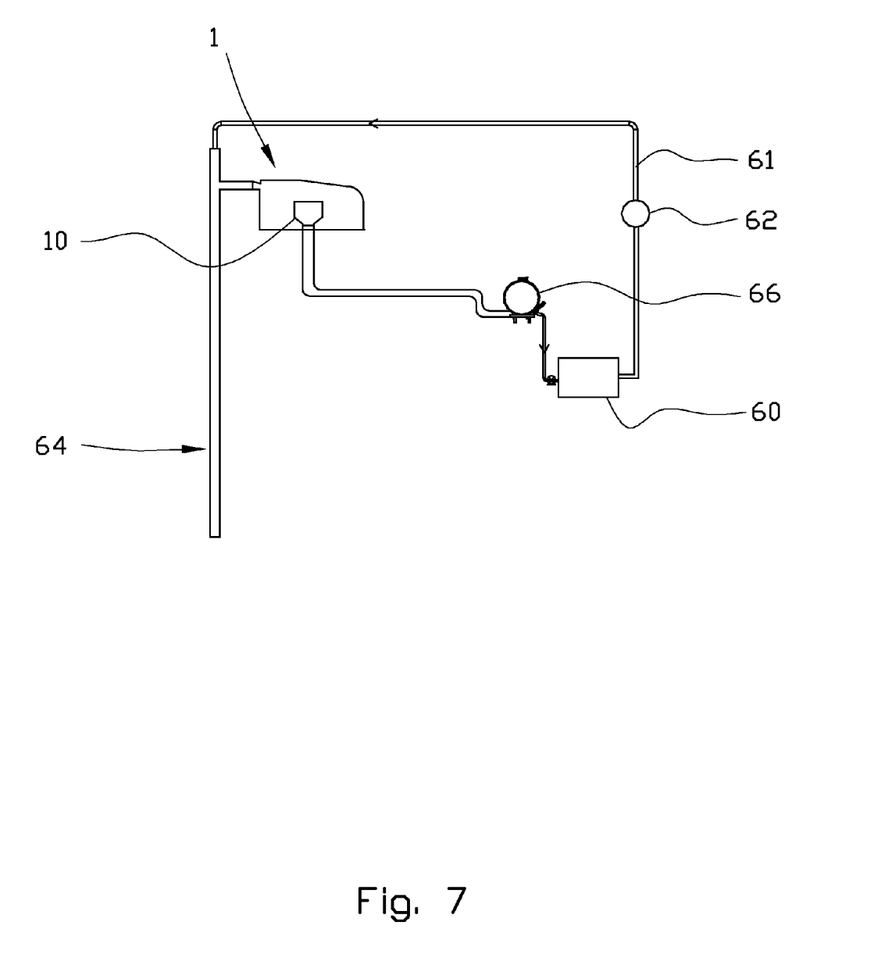
FIG. 7 shows, on a smaller scale, a principle drawing of a drilling-fluid circulation system in which the sieve device is included.

In FIG. 7 is shown, on a smaller scale, a principle drilling-fluid circulation system in which the apparatus 1 is included. Such a circulation system will be well known to a person skilled in the art and, thus, will be mentioned only briefly. From a container 60 for active drilling fluid and through a conduit 61, drilling fluid is conveyed by means of a pump 62 down a drill string (not shown) in a well 64. Drilling fluid and cuttings are carried out of the well 64 to a sieve apparatus 1 in which the drilling fluid is cleaned of particles exceeding a predetermined size. By means of an under pressure-generating device 66, drilling fluid that has been cleaned of said particles is returned to the container 60 and recirculated down the well 64.

By circulating one or more RFID tags (not specifically shown in FIG. 7), for example, together with the drilling fluid down the well 64, well data may be collected. The RFID tag(s) may be read by means of one or more of the transceivers 9, 9', 9" (see for example FIGS. 1-3). Well data of importance to the wear of the sieve device may then be used to estimate the lifetime of the sieve device, a lifetime which is monitored by means of the method and apparatus according to the first and second aspects of the invention. The RFID tag(s) circulated in the well 64 could also collect well data that could be used beyond estimating the lifetime of the sieve device. An example of this is data which may be used in connection with well monitoring.

Thus, the receiver 9, 9', 9" which is arranged in association with the sieve apparatus 1 may also be used in connection with monitoring a drilling operation. RFID tags larger than the mesh apertures of the sieve device are carried past the receiver 9" (see FIG. 2), which is placed in the secondary filter 10' of the sieve apparatus, and are circulated on into the well 64 and further back to the sieve apparatus 1 together with solid particles and drilling fluid, where the RFID tag is registered again and read by the receiver 9, 9', for example.

In cases in which the RFID tag(s) is/are smaller than the mesh apertures of the filter belt 4 and the secondary filter, the tags could be circulated together with the drilling fluid.

RFID tags provided with pressure and temperature sensors are known. Well parameters may thereby be collected from the well by means of the method as outlined above.

Thus, the present invention provides a possibility of improved monitoring of the integrity of a rotating, endless sieve device in which signal transmitters may be placed in desired locations on the sieve device and possibly be moved in order to monitor one or more areas that show more wear than other areas.

While the invention has been described with a certain degree of particularity, many changes may be made in the details of construction and the arrangement of components without departing from the spirit and scope of this disclosure. It is understood that the invention is not limited to the embodiments set forth herein for purposes of exemplification, but is limited only by the scope of the attached claims, including the full range of equivalency to which each element thereof is entitled.

The invention claimed is:

1. A method of monitoring the integrity of an endless sieve device (3) which is arranged to rotate around at least two spaced-apart turning rollers, the sieve device (3) being arranged to separate fluid and particles under a predetermined size from particles over the predetermined size, the method comprising the steps of:
   positioning at least one signal transmitter (7) at a portion of the sieve device (3) by means of a holding device (5, 5', 5") including a wear element (51, 51', 51") which is arranged to release at least the signal transmitter (7) from the sieve device (3) when the wear element (51, 51', 51") is worn away;
   putting the at least one signal transmitter (7) in communication with at least one receiver (9), so that the signal transmitter (7) is capable of outputting a signal to the at least one receiver (9) at least once per turn of the sieve device (3);
   exposing the holding device (5, 5', 5") to wear; and
   letting the receiver (9) output a signal activating a warning device when the expected signal from the signal transmitter (7) ceases.

2. The method in accordance with claim 1, wherein the wear element (51) includes at least one coupling element (51) which is attached to a portion (31) of the sieve device (3), and wherein the coupling element (51) is exposed to wear in such a way that the holding device (5) is released from the sieve device (3) when every one of the at least one coupling element (51) loses its attachment to the portion (31) of the sieve device (3).

3. The method in accordance with claim 1, wherein the wear element is constituted by a housing (5', 5") arranged to house the signal transmitter (7), at least a portion of the housing (5', 5") being exposed to wear in such a way that the signal transmitter (7) is released from the housing (5', 5") when a sufficiently large portion of the housing has been worn away, so that the signal transmitter (7) can pass through the worn portion of the housing (5', 5").

4. The method according to claim 2, wherein the holding device (5, 5', 5") is exposed to substantially the same wear as the sieve device (3) once the sieve device (3) is put into service for the first time.

5. The method according to claim 2, wherein the holding device (5, 5', 5") is exposed to substantially the same wear as the sieve device (3) only after the sieve device (3) has sustained some wear and tear.

6. The method according to claim 1, wherein the method further includes placing a second receiver (9') which is arranged to communicate with the signal transmitter (7) in a downstream portion of the sieve device (3), and wherein the second receiver (9') is arranged to output a signal to a warning device when a signal is received from the signal transmitter (7), so that a warning is given about the signal transmitter (7) being detached from the sieve device (3).

7. The method according to claim 1, wherein the sieve device is constituted by a supporting belt (3) and by a filter belt (4) with a finer mesh aperture than the supporting belt (3), wherein the filter belt (4) is placed on the supporting belt (3), and wherein the at least one signal transmitter (7) is placed in the supporting belt (3).

8. The method according to claim 7, wherein the method further includes providing the filter belt (4) with at least one further signal transmitter (7') which is arranged for information communication with at least one of the at least one receiver (9); and putting the receiver (9) in communication with a control system which checks, at least when starting up after replacement of the filter belt (4), whether a signal is received from the signal transmitter (7') and whether the signal contains the expected information; and outputting a signal to a warning device if a signal fails to appear or if the signal is not as expected.

9. The method according to claim 8, wherein an RFID tag is used as the signal transmitter (7, 7').

10. The method according to claim 1, wherein an RFID tag is used as the signal transmitter (7).

11. Apparatus for monitoring the integrity of an endless sieve device (3) which is arranged to rotate around at least two spaced-apart turning rollers, the sieve device (3) being arranged to separate fluid and particles under a predetermined size from particles over the predetermined size, the apparatus comprising:
    a holding device (5, 5', 5") arranged to carry a signal transmitter (7) in a desired portion of the sieve device (3), the holding device (5, 5', 5") including a wear element (51, 51', 51") which is arranged to release at least the signal transmitter (7) from the sieve device (3) when the wear element is worn away;
    a receiver (9) which is arranged to receive a signal from the signal transmitter (7); and
    a control system which is arranged in such a way that the receiver (9) outputs a signal to a warning device when an expected signal from the signal transmitter (7) ceases.

12. The apparatus according to claim 11, wherein the wear element includes at least one coupling element (51) which is arranged to provide engagement between the holding device (5) and the supporting belt (3), the engagement coming to an end as the coupling element (51) has been worn away.

13. The apparatus according to claim 12, wherein the wear element is constituted by a housing (51', 51") which is arranged to house the signal transmitter (7) until a sufficiently large portion of the housing has been worn away so that the signal transmitter (7) may pass through the worn portion of the housing (51', 51").

14. The apparatus according to claim 12, wherein the housing (51') is constituted by a bore (5') in a portion of the supporting belt (3), and wherein the centre axis of the bore (5') is arranged eccentrically relative to said portion of the supporting belt (3).

15. The apparatus according to claim 13, wherein the housing is constituted by a jacket.

16. The apparatus according to claim 11, wherein the sieve device includes a supporting belt (3) and a filter belt (4) with a finer mesh aperture than the supporting belt (3), wherein the filter belt (4) is placed on the supporting belt (3), and wherein the at least one signal transmitter (7) is placed in the supporting belt (3).

17. The apparatus according to claim 16, wherein the filter belt (4) is provided with at least one further signal transmitter (7') which is arranged for information communication with a receiver (9, 9'), the receiver (9, 9') being arranged to be put in communication with a control system which is arranged in such a way that it checks, at least when starting up after replacement of the filter belt (4), whether a signal is received from the signal transmitter and whether the signal contains an expected piece of information, the control system being arranged to output a signal to a warning device when an expected signal from the further signal transmitter (7') fails to appear.

18. Use of the sieve apparatus of claim 11 to record well data that are being brought up from a well (64) by means of data collected by means of at least one RFID tag which has been circulated in the well (64).

* * * * *